United States Patent [19]

Michael et al.

[11] Patent Number: 4,957,887

[45] Date of Patent: Sep. 18, 1990

[54] MAGNESITE-CARBON REFRACTORIES

[75] Inventors: David J. Michael, White Oak; David A. Kirk; Leigh F. Brooks, both of Pittsburgh, all of Pa.

[73] Assignee: Dresser Industries, Inc., Dallas, Tex.

[21] Appl. No.: 497,428

[22] Filed: Mar. 22, 1990

Related U.S. Application Data

[63] Continuation-in-part of Ser. No. 274,387, Nov. 21, 1988.

[51] Int. Cl.$^5$ ........................ C04B 35/04; C04B 35/54
[52] U.S. Cl. ..................................... 501/101; 266/280; 266/286
[58] Field of Search ................. 501/101; 266/280, 286

[56] References Cited

U.S. PATENT DOCUMENTS

| | | | |
|---|---|---|---|
| 4,306,030 | 12/1981 | Watanabe et al. | 501/101 |
| 4,431,745 | 2/1984 | Watanabe et al. | 501/101 |
| 4,454,239 | 6/1984 | Cassens, Jr. | 501/101 |
| 4,912,068 | 3/1990 | Michael | 266/286 |

Primary Examiner—William R. Dixon, Jr.
Assistant Examiner—Deborah Jones
Attorney, Agent, or Firm—Sigalos, Levine & Montgomery

[57] ABSTRACT

A mix for forming a carbon-bonded refractory comprising from about 8 to 30 wt. % of a high purity carbon, about 0.1 to 1 wt. % of aluminum metal, magnesium metal, or a mixture thereof, and the balance a high purity magnesite, and for each 100 wt. % of said magnesite, carbon, and metal, a carbonaceous bonding agent in an amount sufficient to bond the mix; said carbon containing at least about 98% carbon and said magnesite containing at least about 98% MgO, and containing less than about 0.03% boron oxide, less than about 0.3% silica, and having a $CaO/SiO_2$ weight ratio above about 2, and the resultant carbon-bonded refractory shapes and liners for metal processing equipment, especially BOF, made from such shapes and the method of increasing the life of liners for such equipment.

31 Claims, No Drawings

MAGNESITE-CARBON REFRACTORIES

CROSS-REFERENCED TO RELATED APPLICATION

The instant application is a continuation-in-part of application serial no. 274,387 filed Nov. 21, 1988.

BACKGROUND OF THE INVENTION

The present invention relates to carbon-containing refractories and in particular magnesite-carbon refractory brick suitable for use in metal processing equipment, especially basic oxygen furnaces (BOF) and other metallurgical vessels wherein the principal mode of wear of the refractory brick lining is slag attack and where high hot strength and high slag resistance of refractory linings are required.

Carbon-containing basic refractory brick have been used in basic oxygen furnaces and other metal processing equipment for many years. In the United States, for example, pitch bonded and burned pitch impregnated magnesite brick have been used since the early 1960's. In other areas of the world, different practices have been used. For instance, pitch bonded and burned pitch impregnated dolomite brick have been used in Europe. In Japan, burned pitch impregnated basic brick with relatively high levels of lime (e.g. 30% CaO and 70% MgO) have been used.

In the late 1970's and early 1980's, a major advance in the technology of refractories for BOF and other vessels was realized with the introduction of magnesite-carbon brick. Unlike the brick that had traditionally been used, these brick contained graphite. Flake graphite was used most often, although in some cases Sri Lankan vein graphite was employed. These magnesite-carbon brick generally had high carbon contents ranging from about 8 to 30%, while the traditional brick contained a maximum of 5% carbon as a rule.

The term "magnesite-carbon brick" as generally used in this industry, and as used herein, refers to brick that contain graphite in combination with deadburned magnesite or magnesia, with the brick containing in excess of 8% by weight carbon.

While use of the magnesite-carbon brick in basic oxygen furnaces and other metal processing equipment did result in longer times between relines, it was perceived in early trials that the performance of these brick could be improved by increasing their hot strength and oxidation resistance. As a result, magnesite-carbon brick that contained powdered metals were developed. These brick have been described in U.S. Pat. No. 4,306,030. The metals used in these brick were aluminum, silicon, and magnesium. The metals increased oxidation resistance by lowering the permeability of the brick and by consuming oxygen that would otherwise have oxidized carbon.

However, the addition of a metal such as aluminum, silicon, and magnesium can have undesirable effects as is set forth in parent U.S. Application Serial No. 274,387 and the product thereof is a "metal-free" mix; i.e. one that does not contain any such metal in any amount to have any effect.

While the "metal-free" brick of such parent patent application represents a significant improvement in refractory technology, a further increase in the wear resistance and strength thereof is desirable.

It is also known as set forth in U. S. Pat. No. 4,431,745 that adding amounts of metal less than 0.5 wt.% does not produce the desired effects of increasing wear resistance and oxidation resistance. Also, as is shown in this patent the use of high levels of metal addition results in decreasing corrosion resistance. It is also known that metal addition can have other negative effects such as the fluxing action caused by oxidized aluminum, increased porosity and porous textures caused by volatilized magnesium, and the loss of carbon from the brick due to the reduction of silica formed from oxidized silicon in the presence of carbon.

SUMMARY OF THE INVENTION

It is the object of this invention to provide improved magnesite-carbon brick which are more refractory and less subject to slag attack than the brick of the prior art.

Briefly, the present invention comprises a mix for forming a refractory comprising from about 8 to 30 wt.% of a high purity carbon, about 0.1 to 1 wt.% aluminum, magnesium, or mixtures thereof, and the balance a high purity magnesite and for each 100 wt.% of said magnesite, carbon, and metal, a carbonaceous bonding agent in an amount sufficient to bond the mix; said magnesite containing at least about 98% MgO, and preferably less than about 0.03% boron oxide, less than about 0.3% silica, and a $CaO/SiO_2$ weight ratio above about 2, and said carbon containing at least about 98% carbon as measured by loss on ignition (LOI). The invention also comprises the resultant refractory shapes, particularly brick, and liners for metal processing equipment, especially BOF, having an increased life using said brick as hereinafter set forth.

DETAILED DESCRIPTION

The essential elements of the instant invention are the high purity magnesite, the high purity carbon, and the low levels of metal addition. It is essential that the brick have the purities discussed below and not exceed the metal levels set forth.

With the magnesite, it is necessary that it contain at least about 98% MgO and contain less than about 0.03% boron oxide, less than about 0.3% silica, and have a $CaO/SiO_2$ weight ratio above about 2.

As to the carbon, it must be a graphite having a loss on ignition (LOI) of 98% carbon, preferably 99%, or greater, or a mixture of such graphite with a minor amount of carbon black. The graphite preferably should have a particle size of −65 mesh (Tyler) or finer for for at least about 75% by weight of the graphite used; preferably about 95% by weight. It is preferred to utilize flake graphite or a vein graphite such as Sri Lankan graphite.

The carbon black can be thermal black which is made by the thermal decomposition of natural gas or furnace black and is, of course, 100% by weight carbon.

With respect to the purity of the materials, this is essential since it is necessary to minimize the amount of boron and silica present in the mix because of its effect on the resultant product. The low boron content is required in order to enable the magnesite grain to be stable in the presence of carbon at high temperatures; particularly the high temperatures present in basic oxygen furnaces.

While not completely understood, it is believed that the increased thermal stability of the brick of the present invention is due also to the fact that there is a limited amount of silica which can react with the carbon to form SiO gas and CO gas which vaporize and weaken the resultant brick.

The noted CaO/SiO$_2$ ratio is also critical in ensuring the stability of the magnesite grains in the presence of carbon at high temperatures.

With respect to the proportions of materials, there should be utilized from about 8 to 30 wt.% of the high purity carbon, about 0.1 to 1 wt.% of aluminum metal, magnesium metal or a mixture thereof, either a physical mixture or as an alloy and the balance, i.e., about 70 to 92 wt.%, of the high purity magnesite. The amount of carbon black is from 0 to 4 wt. % and when used will, of course, lower the amount of graphite utilized by the amount of carbon black added. If a mixture of the metal powders is used, any ratio thereof can be used, but it is preferred to use equal weights of each.

The particle size or the graded size of the magnesite is not critical; it should be that conventionally used in making this type of brick.

With respect to the graphite, it is preferred to use a fine particle size as discussed above. Although it is known that the oxidation resistance of graphite decreases as graphite gets finer and that the thermal conductivity of magnesite-carbon brick decreases as the particle size of the graphite decreases, it has surprisingly been found that the increased purity of the graphite and its combination with the high purity magnesite overcomes these prior problems to give brick of increased thermal stability. In addition, having some fine graphite in the matrix of the brick can cause the resultant brick to have a lower permeability.

Also, the addition of the minor amounts of aluminum and/or magnesium metal acts to increase the hot strength of the refractory. The carbon black has a very fine particle size and is used in its available grind sizes. As to the aluminum and magnesium metal powder the particle size is not critical, and again it can be of a graded size conventionally used in making metal-containing brick. It is critical not to permit the metal amounts to get too high in order to avoid the possibility of the fluxing action that can be caused by oxidized aluminum and the increased porosity and porous textures that can be caused by volatilized magnesium. The use of low levels of aluminum and/or magnesium addition gives the desired increase in hot strength in the refractory without the undesirable effects associated with such metals.

However, it is critical to note that the improvements in hot strength without the deleterious effects are only possible when the low level metal addition is used in combination with the high purity magnesite and high purity graphite.

Also included in the mix must be a carbonaceous bonding agents that yields high levels of carbon on pyrolysis; i.e. over about 25% by weight carbon. Examples are any novolak or resol resin, tar, pitch or mixtures thereof, and the like conventionally used for bonding brick. At the temperatures at which these brick are used, these materials are decomposed and the carbon derived acts to bind the brick. The amounts thereof are not critical and any amount sufficient to bond the mix can be utilized, but it is desired to avoid high binder levels in order to avoid difficulties in brick formation during processing. Ordinarily about 1.5 to 6% by weight; preferably 2.5 to 4%, of such bonding agent is added for each 100% by weight of the mix.

The method of forming the brick is not critical in that the components noted above can simply be admixed, pressed into shape in the usual brick-making presses, and then baked at the conventional temperatures; i.e., about 250 to 550° F. to form the unburned brick which are then used as noted above, particularly as linings for basic oxygen furnaces. In the use, the bricks become burned at high temperatures in such furnaces to form carbon-bonded brick of high hot strength and improved slag resistance.

The brick of the present invention are particularly suitable as linings for basic oxygen furnaces where their increased hot strength, slag resistance, and stability at high temperatures results in longer times between furnace relines.

The brick of the present invention are made to the size and shape required to form the entire lining or a portion of lining of any shape metallurgical vessel. The linings are formed in the conventional manner by forming courses, or rings, of the proper size brick about the interior of the vessel. Other construction techniques are also commonly used and, of course, in areas where brick cannot be used, refractory ramming mixes are utilized.

The invention will be further described in connection with the following examples which are set forth for purposes of illustration only.

In these examples the magnesite used had the following chemistries:

| Magnesite Type | A | B |
|---|---|---|
| Chemical Analysis (Calcined Basis) | | |
| Silica (SiO$_2$) | 0.82% | 0.07% |
| Alumina (Al$_2$O$_3$) | 0.16 | 0.10 |
| Titania (TiO$_2$) | <0.01 | <0.01 |
| Iron Oxide (Fe$_2$O$_3$) | 0.13 | 0.10 |
| Chromic Oxide (Cr$_2$O$_3$) | <0.02 | 0.08 |
| Lime (CaO) | 2.30 | 0.54 |
| Boron Oxide (B$_2$O$_3$) | 0.024 | <0.005 |
| Total Analyzed | 3.4 | 0.9 |
| By Difference Magnesia (MgO) | 96.6 | 99.1 |
| Total | 100.0% | 100.0% |

A series of seven brick were made from mixes with the components and the proportions thereof as set forth in Table I. The brick were made by pressing the mix in a conventional brick press at about 18,000 psi with pauses at 2500 and 7500 psi and the brick cured using a baking schedule of 100° F./hr to 350° F. with a 3-hour hold, and the brick were tested as to porosity and crushing strength and the results are also set forth in Table I below.

TABLE I

| Example No. | 1 | 2 | 3 | 4 | 5 | 6 | 7 |
|---|---|---|---|---|---|---|---|
| Type of Magnesite: | B | B | B | B | B | B | B |
| Mix (wt. %): | | | | | | | |
| Magnesite | 83 | 82.9 | 82.8 | 82.7 | 82.6 | 82.5 | 82.0 |
| Graphite (LOI = 99%) | 17 | 17 | 17 | 17 | 17 | 17 | 17 |
| Aluminum Metal | 0 | 0.1 | 0.2 | 0.3 | 0.4 | 0.5 | 1.0 |
| Plus Additions: | | | | | | | |

TABLE I-continued

| Example No. | 1 | 2 | 3 | 4 | 5 | 6 | 7 |
|---|---|---|---|---|---|---|---|
| Phenolic Resin Bond | 3.2 | 3.2 | 3.2 | 3.2 | 3.2 | 3.2 | 3.2 |
| Bulk Density, pcf: | 182 | 182 | 181 | 182 | 182 | 182 | 181 |
| Porosity Data (After Coking at 2000° F.) | | | | | | | |
| Bulk Density, pcf: | 175 | 175 | 174 | 174 | 174 | 174 | 174 |
| Apparent Porosity, %: | 9.8 | 10.7 | 10.7 | 10.7 | 10.7 | 10.5 | 10.6 |
| Apparent Specific Gravity: | 3.11 | 3.13 | 3.13 | 3.12 | 3.12 | 3.12 | 3.12 |
| Crushing Strength at 2800° F., psi | 2950 | 3550 | 3210 | 3650 | 4090 | 3760 | 4410 |

It is to be noted that there are improvements in the hot crushing strength with the addition of as little as 0.1 wt.% aluminum metal powder., a level at which the prior art states it is not possible to obtain ( 5 improved results.

EXAMPLES 8 to 14

A series of seven brick were made as in Examples 1-7, except that magnesium metal was used in place of the aluminum. The mix components, proportions, and test results are set forth in Table II below.

TABLE II

| Example No. | 8 | 9 | 10 | 11 | 12 | 13 | 14 |
|---|---|---|---|---|---|---|---|
| Type of Magnesite: | B | B | B | B | B | B | B |
| Mix (wt. %): | | | | | | | |
| Magnesite | 83 | 82.9 | 82.8 | 82.7 | 82.6 | 82.5 | 82.0 |
| Graphite (LOI = 99%) | 17 | 17 | 17 | 17 | 17 | 17 | 17 |
| Magnesium Metal | 0.1 | 0.2 | 0.3 | 0.4 | 0.5 | 1.0 | 0.15 |
| Aluminum Metal | — | — | — | — | — | — | 0.15 |
| Plus Additions: | | | | | | | |
| Phenolic Resin Bond | 3.2 | 3.2 | 3.2 | 3.2 | 3.2 | 3.2 | 3.2 |
| Bulk Density, pcf: | 182 | 181 | 181 | 180 | 180 | 180 | 182 |
| Porosity Data (After Coking at 2000° F.) | | | | | | | |
| Bulk Density, pcf: | 173 | 174 | 174 | 175 | 174 | 174 | 174 |
| Apparent Porosity, %: | 11.2 | 11.0 | 10.9 | 10.6 | 10.9 | 10.6 | 10.8 |
| Apparent Specific Gravity: | 3.12 | 3.13 | 3.13 | 3.13 | 3.13 | 3.12 | 3.13 |
| Crushing Strength at 2800° F., psi | 3320 | 3500 | 3700 | 3560 | 3340 | 4030 | 3770 |

Here again, as with the addition of low levels of aluminum, there are improvements in hot crushing strength with the addition of as little as 0.1 wt.% magnesium metal.

EXAMPLES 15 to 18

A series of four brick were made as in Examples 1-7 utilizing aluminum metal addition, but with a magnesite having a purity of only 96.6% MgO. The mix components, proportions, and test results are set forth in Table III below.

TABLE III

| Example No. | 15 | 16 | 17 | 18 |
|---|---|---|---|---|
| Type of Magnesite: | A | A | A | A |
| Mix (wt. %): | | | | |
| Magnesite | 83 | 82.7 | 82.4 | 82.1 |
| Graphite (LOI = 99%) | 17 | 17 | 17 | 17 |
| Aluminum Metal | 0 | 0.3 | 0.6 | 0.9 |
| Plus Additions: | | | | |
| Phenolic Resin Bond | 3.5 | 3.5 | 3.5 | 3.5 |
| Bulk Density, pcf: | 184 | 184 | 184 | 184 |
| Porosity Data (After Coking at 2000° F.) | | | | |
| Bulk Density, pcf: | 177 | 176 | 177 | 177 |
| Apparent Porosity, %: | 10.1 | 9.8 | 9.6 | 9.4 |
| Apparent Specific Gravity: | 3.15 | 3.13 | 3.13 | 3.12 |
| Crushing Strength at 2800° F., psi | 3290 | 3080 | 2760 | 3240 |

It will be seen that aluminum metal addition even up to 0.9 wt.% had no effect on the hot crushing strength. Higher levels of aluminum metal addition were required to obtain an increase in crushing strength with such low purity magnesites and with such higher metal addition the undesired effects previously noted often appear.

EXAMPLES 19 to 21

A series of three brick were made as in Examples 1-7 utilizing aluminum or aluminum and magnesium metal addition, but with again a magnesite having only 96.6% MgO and in the case of Examples 19 and 21 with the graphite having an LOI of only 88.1%. The mix components, proportions, and test results are set forth in Table IV below.

TABLE IV

| Example No. | 19 | 20 | 21 |
|---|---|---|---|
| Type of Magnesite: | A | A | A |
| Mix (wt. %): | | | |
| Magnesite | 80 | 80 | 80 |
| Graphite (LOI = 88.1%) | 17 | — | 17 |
| Graphite (LOI = 98.4%) | — | 17 | — |
| Aluminum Metal | 1.5 | 1.5 | 3.0 |
| Magnesium Metal | 1.5 | 1.5 | — |
| Plus Additions: | | | |
| Coal Tar Pitch | 3.5 | 3.5 | 3.5 |
| Bulk Density, (After 500° F. Baking, pcf (Av 3): | 177 | 177 | 178 |
| Data from Porosity | | | |

TABLE IV-continued

| Example No. | 19 | 20 | 21 |
| --- | --- | --- | --- |
| (After 500° F. Baking) | | | |
| Bulk Density, pcf (Av 3): | 174 | 174 | 174 |
| Apparent Porosity, %: (Av 3): | 7.4 | 6.5 | 7.4 |
| Apparent Specific Gravity (Av 3): | 3.01 | 2.99 | 3.01 |
| Data from Porosity (After 2000° F. Coking) (Av 3) | | | |
| Bulk Desity, pcf: | 170 | 174 | 173 |
| Apparent Porosity, %: | 13.5 | 10.6 | 11.9 |
| Apparent Specific Gravity: | 3.15 | 3.11 | 3.15 |
| Weight Change in Coking, %: | −0.44 | −0.27 | −0.9 |
| Change in Porosity during Coking, %: | 6.1 | 4.1 | 4.5 |
| Modulus of Rupture, psi (Av 6) | | | |
| At 2000° F.: | 1490 | 2610 | 1410 |
| Standard Deviation: | 204 | 487 | 221 |
| Crushing Strength at 2800° F., psi (Av 5): | 1130 | 3270 | 1760 |
| Standard Deviation: | 269 | 584 | 262 |

These data show the increase in porosity when the brick goes from the baked state to the coked state. This is an indication of what will happen when this brick is heated to operating temperatures in an actual metallurgical vessel, such as a BOF. The mix of Example 19 had a 6.1% increase in porosity on coking, as opposed to only a 4.1% increase in coking with Example 20 containing the high purity graphite.

The higher increase in porosity for Example 19 was apparently caused by some interaction between the low purity graphite and the magnesium. This is further illustrated by comparing Example 19 with Example 21. Both of these mixes were made with low purity graphite, but the mix of Example 21 contained only aluminum and the porosity increase of the brick of Example 21 was lower than that of the brick of Example 19.

Also to be noted is the large increase in strength (modulus of rupture and hot crushing strength) of the brick of Example 20 as compared to the brick of Example 19 which are identical in formulation except for the fact the mix of Example 20 uses a high purity graphite. Use of a high purity magnesite in conjunction with the high purity graphite results in even better hot crushing strength.

EXAMPLES 22 to 24

A series of three brick were made as in Examples 1–7 utilizing aluminum or magnesium metal addition and with silica addition to the mix of Examples 22 and 23. The mix components, proportions, and test results are set forth in Table V below.

TABLE V

| Example No. | 22 | 23 | 24 |
| --- | --- | --- | --- |
| Type of Magnesite: | A | A | A |
| Mix (wt. %): | | | |
| Magnesite | 80 | 80 | 80 |
| Graphite (LOI = 99%) | 17 | 17 | 17 |
| Aluminum Metal | 3 | — | — |
| Magnesium Metal | — | 3 | 3 |
| Plus Additions: | | | |
| Fumed Silica | 0.8 | 0.8 | — |
| Coal Tar Pitch | 3.4 | 3.4 | 3.4 |
| Bulk Density, after Baking, pcf (Av 5): | 178 | 174 | 178 |
| Data from Porosity (after Baking), pcf (Av 5) | | | |
| Bulk Density, pcf: | 175 | 172 | 174 |
| Apparent Porosity, %: | 7.0 | 7.4 | 7.7 |
| Apparent Specific Gravity: | 3.02 | 2.97 | 3.02 |
| Data from Porosity (after Coking) (Av 3) | | | |
| Bulk Density, pcf: | 175 | 169 | 173 |
| Apparent Porosity, %: | 9.0 | 13.1 | 10.4 |
| Apparent Specific Gravity: | 3.07 | 3.11 | 3.10 |
| Increase in Porosity During Coking, %: | 2.0 | 5.7 | 2.7 |
| Modulus of Rupture at 2000° F., psi (Av 5) | 1840 | 1510 | 1350 |
| Crushing Strength at 2800° F., psi (Av 5): | 2890 | 1330 | 2070 |

It is known that graphite ash contains a relatively large amount of silica. Examples 22 to 24 were run to determine if it was an interaction between magnesium and silica that caused high porosity during coking.

The brick of Examples 22 and 23 were made with high purity 99% LOI graphite with an addition of fine silica. The brick of Example 22 containing aluminum exhibited only a 2% porosity increase during coking. The brick of Example 23 containing magnesium exhibited a 5.7 increase in porosity during coking, resulting in a high coked porosity of 13.1%. These results tend to confirm that it is an interaction between silica and magnesium that resulted in the high porosity increase. The results are further confirmed by the brick of Example 24 which contained high purity graphite and magnesium, but no fumed silica addition. The porosity increase on coking of this mix was only 2.7%.

Based on all the foregoing, while it is not clearly understood why aluminum addition to brick made with high purity magnesite caused unexpectedly greater improvements in the hot crushing strengths compared to brick made with lower purity magnesites, it is believed that a small amount of aluminum undergoes oxidation, making it available to react with the silicates in the magnesite grain to produce low melting phases. With the higher purity magnesite, there is a much lesser opportunity to create those low melting phases due to the lower silicate content in the grain. Had the brick contained low purity graphite, the fluxing potential of the aluminum would have presumably been greater because of the potential for formation of greater amounts of oxidized aluminum due to reduction of oxide constituents within the graphite ash. Thus, to minimize the fluxing potential of the aluminum, the brick would have to contain both high purity magnesite and high purity graphite.

Also, as to why heretofore the addition of minor amounts of magnesium has not been beneficial in magnesite-carbon brick is believed to be due to the fact that in brick made with low purity graphite plus magnesium, there is a porosity increase in coking that negates any improvement in hot crushing strength at low metal contents. Higher coked porosities tend to lower the hot crushing strength.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A mix for forming a magnesite-carbon refractory comprising from about 8 to 30 wt.% of a high purity carbon consisting of 0–4 wt.% carbon black and the balance graphite, about 0.1 to 1 wt.% of aluminum metal, magnesium metal, or a mixture thereof, and the balance a high purity magnesite, and a carbonaceous bonding agent in an amount sufficient to bond the mix; said magnesite containing at least about 98% MgO and containing less than about 0.03% boron oxide, less than about 0.3% silica, and having a $CaO/SiO_2$ weight ratio above about 2, and said graphite having a loss on ignition of at least about 98%.

2. The mix of claim 1 wherein said magnesite contains at least 99% MgO and said carbonaceous bonding agent is a novolak resin, a resol resin, tar, pitch, or mixtures thereof.

3. The mix of claim 1 or 2 wherein said graphite is a flake or vein graphite.

4. The mix of claim 1 or 2 wherein said graphite is a flake or vein graphite having at least about 75% by weight −65 mesh or finer particles and a loss on ignition of at least about 99%, and said bonding agent is present in an amount of about 1.5 to 6 wt.% for each 100 wt.% of said magnesite, graphite, and metal.

5. A mix for forming a magnesite-carbon refractory consisting essentially of from about 8 to 30 wt.% of a high purity carbon consisting of 0 to 4 wt. % carbon black and the balance a flake or vein graphite, about 0.1 to 1 wt.% of aluminum metal, magnesium metal, or a mixture thereof, and the balance a high purity magnesite, and for each 100 wt.% of said magnesite, carbon, and metal, from about 1.5 to 6 wt.% of a carbonaceous bonding agent selected from novolak resins, resol resins, tar, pitch or mixtures thereof; said magnesite containing at least about 98% MgO and containing less than about 0.03% boron oxide, less than about 0.3% silica, and having a $CaO/SiO_2$ weight ratio above about 2, and said graphite having a loss on ignition of at least about 98% and at least about 75% by weight −65 mesh or finer particles 6. The mix of claim 5, wherein the metal is aluminum.

7. The mix of claim 5, wherein the metal is magnesium.

8. The mix of claim 5 wherein, the metal is a mixture of aluminum and magnesium.

9. An unburned magnesite-carbon refractory shape consisting of a baked mix comprising, from about 8 to 30 wt.% of a high purity carbon consisting of 0–4 wt.% carbon black and the balance graphite, about 0.1 to 1 wt.% of aluminum metal, magnesium metal, or a mixture thereof, and the balance a high purity magnesite, and for each 100 wt.% of said magnesite, carbon, and metal, a carbonaceous bonding agent in an amount sufficient to bond the mix; said magnesite containing at least about 98% MgO and containing less than about 0.03% boron oxide, less than about 0.3% silica, and having a $CaO/SiO_2$ weight ratio above about 2, and said graphite having a loss on ignition of at least about 98%.

10. The refractory shape of claim 9 wherein said shape is a brick and said magnesite contains at least 99% MgO.

11. The refractory shape of claim 9 or 10 wherein said graphite is a flake or vein graphite.

12. The refractory shape of claim 9 or 10, wherein said carbonaceous bonding agent is a novolak resin, a resol resin, tar, pitch, or mixtures thereof and is present in an amount of about 1.5 to 6 wt.% for each 100 wt.% of said magnesite, graphite, and metal.

13. The refractory shape of claim 9 or 10 wherein the metal is aluminum.

14. The refractory shape of claim 9 or 10 wherein the metal is magnesium.

15. The refractory shape of claim 9 or 10 wherein the metal is a mixture of aluminum and magnesium.

16. An unburned refractory brick consisting essentially of a baked mix consisting essentially of from about 8 to 30 wt.% of a high purity carbon consisting of 0–4 wt.% carbon black and the balance graphite, about 0.1 to 1 wt.% of aluminum metal, magnesium metal, or mixtures thereof, and the balance a high purity magnesite, and for each 100 wt.% of said magnesite, carbon, and metal, from about 1.5 to 6 wt.% of a carbonaceous bonding agent; said magnesite containing at least about 98% MgO and containing less than about 0.03% boron oxide, less than about 0.3% silica and having a $CaO/SiO_2$ weight ratio above about 2, and said graphite having a loss on ignition of at least about 98% and at least about 75% by weight −65 mesh or finer particles.

17. The refractory brick of claim 16 wherein said carbonaceous bonding agent is a novolak resin, a resol resin, tar, pitch, or mixtures thereof. , 18. The refractory brick of claim 16 or 17 wherein said graphite is a flake or vein graphite.

19. A refractory brick lining for metal processing equipment comprising a plurality of unburned magnesite-carbon brick, said brick consisting essentially of a baked mix comprising from about 8 to 30 wt.% of a high purity carbon consisting of 0–4 wt.% carbon black and the balance graphite, and about 0.1 to 1 wt.% aluminum metal, magnesium metal or mixtures thereof, and the balance a high purity magnesite, and for each 100 wt.% of said magnesite, carbon and metal a carbonaceous bonding agent in an amount sufficient to bond said mix; said magnesite containing at least about 98% MgO and containing less than about 0.03% boron oxide, less than about 0.3% silica, and having a $CaO/SiO_2$ weight ratio above about 2, and said graphite having a loss on ignition of at least about 98%.

20. The refractory brick liner of claim 19 wherein the magnesite contains at least about 99% MgO, the carbon is a flake or vein graphite having at least about 75% by weight −65 mesh or finer particles, and said bonding agent is present in an amount of from about 1.5 to 6 wt.% for each 100 wt.% of magnesite, graphite, and metal.

21. The refractory brick liner of claim 19 or 20 wherein said carbonaceous bonding agent is a novolak resin, a resol resin, tar, pitch, or mixtures thereof.

22. The refractory brick liner of claim 19 or 20 wherein the metal is aluminum.

23. The refractory brick liner of claim 19 or 20 wherein the metal is magnesium.

24. The refractory brick liner of claim 19 or 20 wherein the metal is a mixture of aluminum and magnesium.

25. The method of increasing the life of liners for metal processing equipment comprising forming a lining in said equipment comprising a plurality of unburned magnesite-carbon brick and subsequently burning said brick; said unburned brick consisting essentially of a baked mix comprising from about 8 to 30 wt.% of a high purity carbon consisting of 0–4 wt.% carbon black and the balance graphite, about 0.1 to 1 wt% of aluminum metal, magnesium metal, or a mixture thereof, and the balance a high purity magnesite, and for each 100 wt.% of said magnesite, graphite and metal, a carbonaceous bonding agent in an amount sufficient to bond the mix; said magnesite containing at least about 98% MgO and containing less than about 0.03% boron oxide, less than about 0.3% silica, and having a $CaO/SiO_2$ weight ratio above about 2, and said carbon having a loss of ignition of at least about 98%.

26. The method of claim 25 wherein the magnesite contains at least about 99% MgO and the graphite is a flake graphite or vein graphite having at least about 75% by weight −65 mesh or finer particles.

27. The method of claim 26 wherein the magnesite contains at least about 99% MgO.

28. The method of claim 25, 26, or 27 wherein said carbonaceous bonding agent is a novolak resin, a resol resin, tar, pitch, or mixtures thereof and is present in an amount of about 1.5 to 6 wt.% for each 100 wt.% of said magnesite, carbon, and metal.

29. The method of claim 25, 26, or 27 wherein the metal is aluminum.

30. The method of claim 25, 26, or 27 wherein the metal is magnesium.

31. The method of claim 25, 26, or 27 wherein the metal is a mixture of aluminum and magnesium.

* * * * *